(12) United States Patent
Fung et al.

(10) Patent No.: US 9,512,257 B2
(45) Date of Patent: Dec. 6, 2016

(54) HALOGEN-FREE, NONFLAMMABLE AND HIGH GLASS TRANSITION TEMPERATURE PHENOLIC RESIN-BASED CURING AGENT AND PROCESS FOR PRODUCING THE SAME

(71) Applicant: NAN YA PLASTICS CORPORATION, Taipei (TW)

(72) Inventors: Dein-Run Fung, Taipei (TW); Te-Chao Liao, Taipei (TW); Chia-Cheng Chao, Taipei (TW); Hao-Sheng Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 14/223,300

(22) Filed: Mar. 24, 2014

(65) Prior Publication Data

US 2014/0296452 A1 Oct. 2, 2014

(30) Foreign Application Priority Data

Mar. 28, 2013 (TW) .............................. 102110551 A

(51) Int. Cl.
| | | |
|---|---|---|
| *C08G 8/28* | (2006.01) | |
| *C08G 8/04* | (2006.01) | |
| *C08G 8/08* | (2006.01) | |
| *C08G 59/62* | (2006.01) | |

(52) U.S. Cl.
CPC . *C08G 8/28* (2013.01); *C08G 8/04* (2013.01); *C08G 8/08* (2013.01); *C08G 59/621* (2013.01)

(58) Field of Classification Search
None
See application file for complete search history.

(56) References Cited

U.S. PATENT DOCUMENTS

| | | | |
|---|---|---|---|
| 2003/0120021 A1* | 6/2003 | Wang et al. | ..................... 528/89 |
| 2004/0024255 A1* | 2/2004 | Wang | ..................... C07F 9/3282 |
| | | | 568/8 |
| 2012/0095156 A1* | 4/2012 | Hayashi et al. | .............. 524/541 |

FOREIGN PATENT DOCUMENTS

WO WO 2010-106698 * 9/2010

OTHER PUBLICATIONS

Ding, e-Polymers, 2010, No. 122, p. 1-13.*

* cited by examiner

*Primary Examiner* — Robert C Boyle
(74) *Attorney, Agent, or Firm* — Bacon & Thomas, PLLC

(57) ABSTRACT

A phenolic-type phosphorous curing agent works by grafting a phosphorous compound onto a benzene ring to substitute hydrogen atoms and is halogen-free and nonflammable; when acting with and curing an epoxy resin, the curing agent helps to form a higher crosslink density and excellent heat tolerance to let the epoxy resin suitable for use in making PCB's insulating layer or semiconductor packaging as well as to endow the PCB's insulating layer or semiconductor packaging provided with excellent flame retardance and high glass transition temperature (Tg).

6 Claims, No Drawings

HALOGEN-FREE, NONFLAMMABLE AND HIGH GLASS TRANSITION TEMPERATURE PHENOLIC RESIN-BASED CURING AGENT AND PROCESS FOR PRODUCING THE SAME

BACKGROUND OF THE PRESENT INVENTION

1. Field of the Invention

The present invention relates to a phosphorus-containing phenolic resin-based curing agent and a process for producing the same, and more particularly, the phenolic-type phosphorous curing agent has a high molecular weight, and is halogen-free and nonflammable, and features a high glass transition temperature. The curing agent is also a halogen-free, nonflammable resin curing agent suitable for use in making PCB's insulating layer or semiconductor packaging.

2. Description of Related Art

In recent years, electronic industry has been grown rapidly, and the trend for electronic devices is toward high frequency, high speed and versatility. For meeting this trend, the design of substrates for electronic devices has to minimize line width and insulating layer thickness. As insulating layers become thinner and thinner, for maintaining the quality necessary for electronic devices, the substrate of insulating layers has to meet certain requirements, such as low dielectric coefficient, low dissipation factor, high glass transition temperature (abbreviated as Tg), high heat tolerance and flame retardance.

Particularly, for environmental protection and life safety, flame retardance is becoming a common requirement for all electronic materials. The current approach to endowing electronic materials with flame retardance is mainly involved in adding nonflammable curing agents. The existing nonflammable curing agents can be divided into additive nonflammable curing agents and reactive nonflammable curing agents. The former ones are added through physical manners, such as being mixed or dispersed in the target polymer to provide flame retardance. A reactive nonflammable curing agent is used chemically to have its specific functional group reacted with the target polymer and then to combine with the polymer and provide flame retardance thereof.

The existing reactive nonflammable curing agents are typically halogen-containing nonflammable resin. For example, in order to make FR4 for PCB that meets the UL94-VO flammability standard, tetrabromobisphenol-A (TBBP-A) is used as a curing agent to perform curing reaction with epoxy resin and then to endow the resultant laminate substrate with flame retardance. However, the TBBP-A is a halogen-containing flame retardant, and burning waste circuit boards and packaging materials made thereof can generate irritant, corrosive gas such as benzofuran and dioxin that cause pollution to the environment and are harmful to humans. One solution for the pollution problem is to use smoke suppressants. However, smoke suppressants may degrade the mechanical properties of the resultant laminate substrates and lead to photolysis of the resultant packaging materials. Meanwhile, smoke suppressants are migratory and volatile in the resultant materials, being unfavorable to the materials in terms of physical properties and flame retardance.

Another type of flame retardants is organic bromine compounds. However, these compounds are also considered to be environmentally pollutant and toxic and not popular on the market. By comparison, organic phosphorus compound-based flame retardants are unlikely to show the aforementioned disadvantages, and thereby the market demand thereof is growing stably. In addition, the advantages of phosphorous-containing flame retardants include low toxicity, good processability, less adding quantity, less smoke development and good compatibility with resin.

Therefore, in recent years, the technical development, researches and inventions of nonflammable curing agents have been focused on phosphorous-containing nonflammable materials. For instance, U.S. Pat. No. 8,124,716 and U.S. Pat. No. 8,143,357 disclose phosphorous-containing compounds to be used as curing agents for epoxy resin to endow the resultant laminate substrates with excellent mechanical properties, high glass transition temperature (Tg), good flame retardance and good thermal stability. Nevertheless, the curing agents of the prior patents involve complicated synthesis processes, have less structural flexibility, and are less manageable in terms of molecular weight, thus being less suitable for PCB applications where high glass transition temperature (Tg) is required.

SUMMARY OF THE INVENTION

For addressing the aforementioned problems, the primary objective of the present invention is to provide a phosphorous-containing phenolic resin-based curing agent (hereinafter referred to as phenolic-type phosphorous curing agent), which has a molecular weight ranging between 550 and 12,000; preferably ranging between 600 and 10,000. In addition to the high molecular weight, the disclosed curing agent has thermal stability, is halogen-free and nonflammable, and features a high Tg. The curing agent of the present invention is suitable for use in making printed circuit boards or semiconductor packaging for satisfying requirements for electronic devices, such as compactness and high integration.

Another primary objective of the present invention is to provide a process for producing the above-mentioned phenolic-type phosphorous curing agent being a halogen-free and nonflammable curing agent as well as being a suitable material for use in making PCB's insulating layer and semiconductor packaging.

The phenolic-type phosphorous curing agent of the present invention has a chemical structure described as followed chemical structure formulas (I), (II), (III), (IV) or (V):

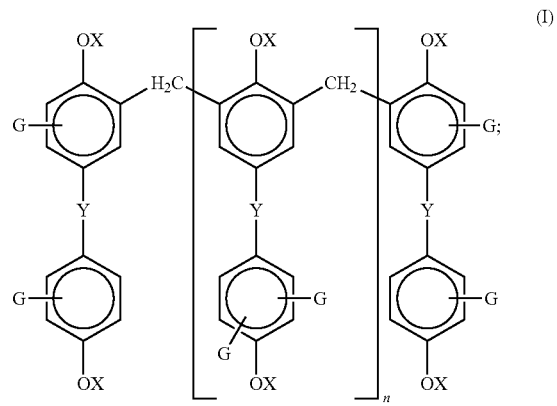

-continued where Y = 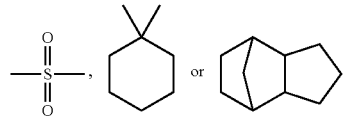

X=H; n is a positive integer greater than zero, which value is determined by the molecular weight;

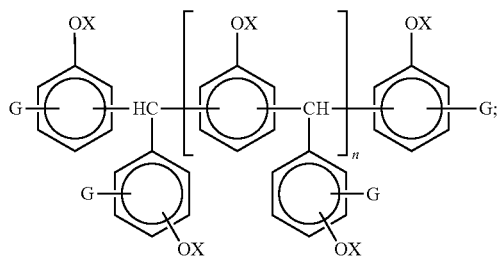
(II)

where, X=H; n is a positive integer greater than zero, which value is determined by the molecular weight;

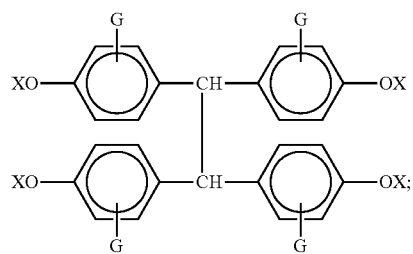
(III)

(IV)

where, X=H; n is a positive integer greater than zero, which value is determined by the molecular weight;

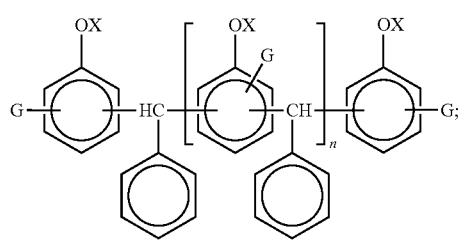
(V)

where, X=H; n is a positive integer greater than zero, which value is determined by the molecular weight; and G presented in the above chemical structures (I)-(V) is $G^1$ or $G^2$:

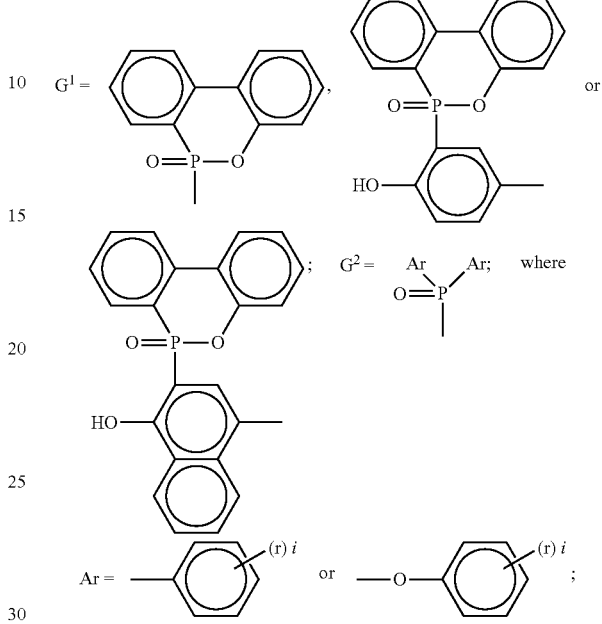

r = H, $C_1$-$C_8$ or aryl;
i = 0-5.

The disclosed phenolic-type phosphorous curing agent works by grafting a phosphorous compound onto a benzene ring to substitute hydrogen atoms, opposite to the conventional phosphorous epoxy resin that has a phosphorous compound bound to its functional group. When reacting with and curing epoxy resin, the disclosed phenolic-type phosphorous curing agent can provide higher crosslink density and better heat tolerance as compared to the prior-art curing agents, thereby making the resultant epoxy resin material have higher Tg.

The disclosed phenolic-type phosphorous curing agent, when used alone to react with epoxy resin for curing, as compared to when used together with a Bisphenol-A type (BPA-type) phosphorous curing agent to react with epoxy resin for curing, can achieve better molecular arrangement to increase crosslink density and further to allow the cured epoxy resin material to have better Tg, peel strength and heat tolerance.

The disclosed phenolic-type phosphorous curing agent has excellent flame retardance, adherence, mechanical and chemical properties and does not contain halogen. After reacting with epoxy resin, the curing agent endows the cured epoxy resin material to display excellent thermal stability, good flame retardance and high Tg as well as being environmentally friendly, and more particularly, Tg is higher than 185° C. The disclosed phenolic-type phosphorous curing agent produces less smoke during its burning and degradation, and the degradation products thereof are less environmentally pollutant, thus being suitable for laminate substrates that require high Tg and excellent flame retardance.

The process for producing the phenolic-type phosphorous curing agent includes the steps of:

a) dehydrating a high-molecular-weight phenolic resin and a phosphorous-containing compound;
b) reacting a certain equivalence ratio of the phenolic resin and the phosphorous-containing compound;
c) adding an amount of a catalyst for catalyzing the reaction of step b); and
d) adding an amount of a water-carrying agent for removing water generated in and thereby promoting the reaction of step c).

The primary objective of the present invention is to synthesize a high-molecular-weight phenolic-type phosphorous curing agent that helps to increase crosslink density during the curing process to improve the resultant laminate material in terms of glass transition temperature (Tg), heat tolerance and flame retardance.

The primary objective of the present invention is to provide a phenolic-type phosphorous curing agent with structural flexibility, and may be a BPA-type, salicylaldehyde-type, glyoxal-type, hydroquinone-type or benzaldehyde-type phosphorous-containing phenolic resin-based curing agent, with its molecular weight adjustable by changing the equivalence ratio of phenol and aldehyde in the phenolic resin. The preparation of the phosphorous curing agent only involves dehydrating a phosphorous compound with the phenolic resin in the presence of a catalyst, so is simple and has less by-reaction, thereby being favorable to industrial manufacturing.

The foregoing phenolic resin may be made by polymerizing at least one selected from the group consisting of phenol, hydroquinone, cresol, ethyl phenol, butyl phenol, octyl phenol, methoxyl phenol, ethoxyl phenol, naphthol, bisphenol-A, bisphenol-F, bisphenol-S and diphenol with at least one selected from the group consisting of formaldehyde, acetaldehyde, alkylaldehyde, glyoxal, salicylaldehyde, benzaldehyde and salicylaldehyde.

The phosphorous-containing compound may be a derivative of DOPO ($C_{12}H_9PO_2$), including at least one of 2-(6-oxid-6H-dibenz<c,e><1,2>oxa-phosphorin-6-yl)methanol (abbreviated as ODOPM) and DOPO-HQ ($C_{18}H_{13}O_4P$).

The foregoing phenolic resin may have its molecular weight ranging between 350 and 4,000; preferably ranging between 500 and 4,000; and most preferably ranging between 1,000 and 3,000.

The phenolic resin and the phosphorous compound may react in a relative equivalence ratio of 1:0.4 to 1:2, and preferably 1:0.6 to 1:1.5.

The foregoing catalyst may be at least one selected from sulfuric acid, methanesulfonic acid, trifluoromethanesulfonic acid, p-toluene sulphonic acid, sodium acetate, potassium acetate, cobalt acetate, ferric acetate, zinc acetate and lead acetate, wherein cobalt acetate provides the best effect.

The catalyst is used in an amount of 1-10%, and preferably 3-5%, by weight of the reactant.

The foregoing water-carrying agent may be at least one selected from benzene, toluene, xylene, butanone, methyl isobutyl ketone, cyclohexanone and cyclohexanol, where in cyclohexanone and cyclohexanol provide the best water-carrying effect.

The water-carrying agent is used in an amount of 5-20%, and preferably 10-15%, by weight of the reactant.

The foregoing solvent for washing may be at least one selected from benzene, toluene, xylene, butanone, methyl isobutyl ketone, cyclohexanone and cyclohexanol.

DETAILED DESCRIPTION OF THE INVENTION

According to the present invention, a phenolic-type phosphorous curing agent has a chemical structure of one of formulas (I), (II), (III), (IV) and (V), and has a molecular weight preferably ranging between 550 and 12,000; more preferably ranging between 600 and 10,000; and most preferably ranging between 700-8,000;

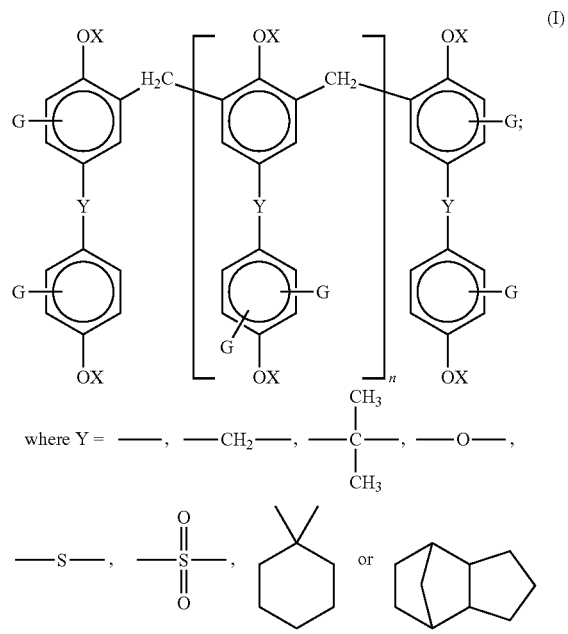

X=H; n is a positive integer greater than zero, which value is determined by the molecular weight;

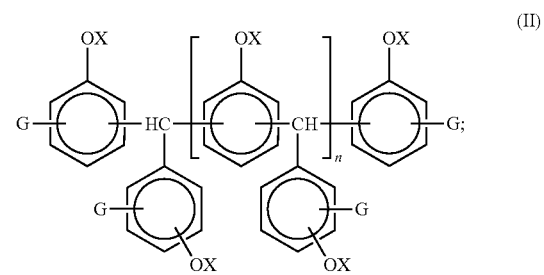

where, X=H; n is a positive integer greater than zero, which value is determined by the molecular weight;

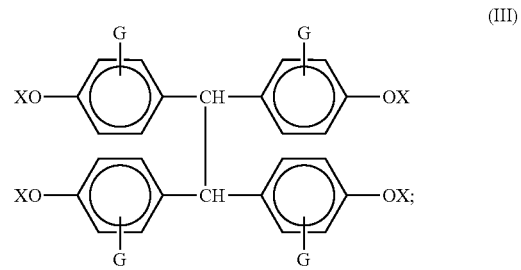

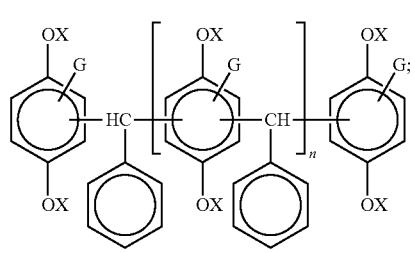
(IV)

where, X=H; n is a positive integer greater than zero, which value is determined by the molecular weight;

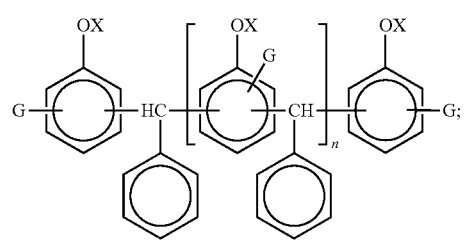
(V)

where, X=H; n is a positive integer greater than zero, which value is determined by the molecular weight;
G presented in the above chemical structures (I)-(V) is $G^1$ or $G^2$:

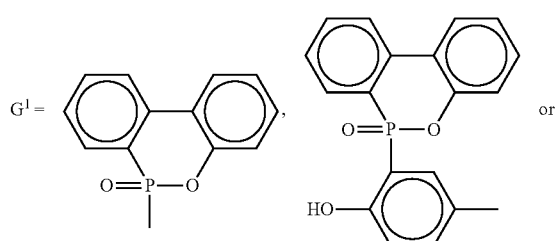

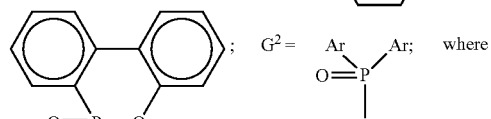

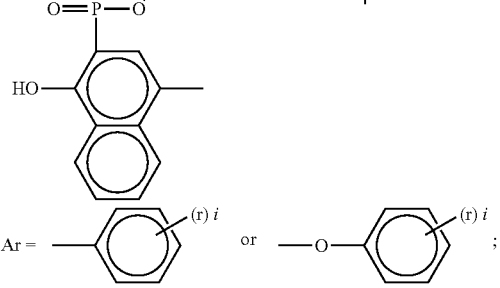

$r = H, C_1-C_8$ or aryl;
$i = 0-5$.

To prepare the disclosed phenolic-type phosphorous curing agent, a phosphorous compound having the above-mentioned chemical structure formula $G^1$ or $G^2$ reacts with a phenolic resin having the following chemical structure (A), (B), (C), (D) or (E):

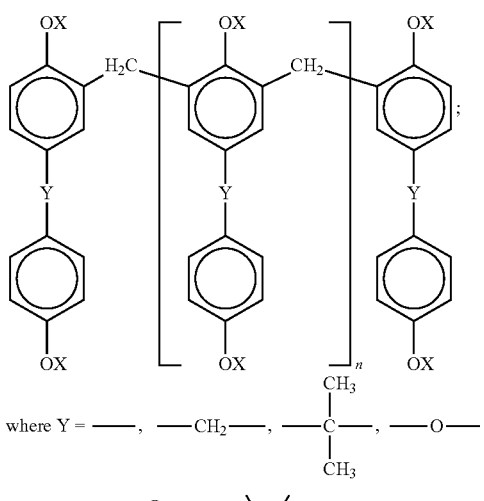
(A)

where Y = ——, —CH$_2$—, —C(CH$_3$)$_2$—, —O—, —S—, —S(O)$_2$—, or cyclohexyl or dicyclopentadienyl X=H; n is a positive integer greater than zero, which value is determined by the molecular weight;

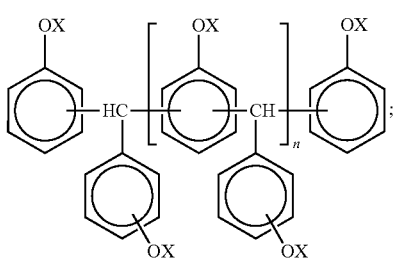
(B)

where, X=H; n is a positive integer greater than zero, which value is determined by the molecular weight;

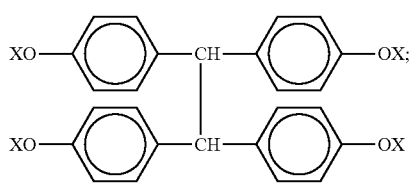
(C)

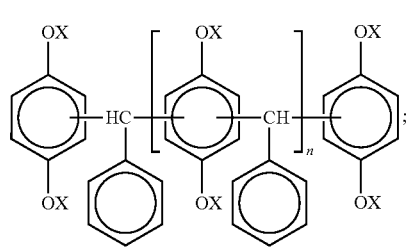
(D)

where, X=H; n is a positive integer greater than zero, which value is determined by the molecular weight;

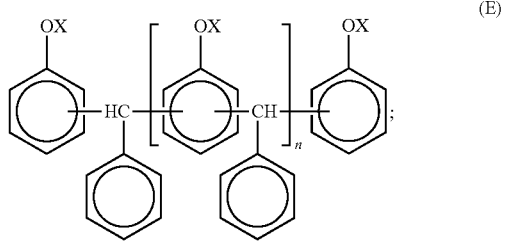

(E)

where, X=H; n is a positive integer greater than zero, which value is determined by the molecular weight;

The process for producing the disclosed phenolic-type phosphorous curing agent of the present invention includes steps of:

a) dehydrating a high-molecular-weight phenolic resin and a phosphorous-containing compound;
b) reacting a certain equivalence ratio of the phenolic resin and the phosphorous-containing compound;
c) adding an amount of a catalyst for catalyzing the reaction of step b); and
d) adding an amount of a water-carrying agent for removing water generated in and thereby promoting the reaction of step c).

The phenolic-type phosphorous curing agent of the present invention provides with structural flexibility and may be a BPA-type, salicylaldehyde-type, glyoxal-type, hydroquinone-type or benzaldehyde-type phosphorous-containing phenolic resin-based curing agent, which molecular weight is adjustable by changing the equivalence ratio of phenol and aldehyde in the phenolic resin.

The process for producing the phenolic-type phosphorous curing agent of the present invention only involves dehydrating a phosphorous compound with the phenolic resin in the presence of a catalyst, so is simple and has less by-reaction, thereby being favorable to industrial manufacturing.

At step a) mentioned above, the phenolic resin may be made by polymerizing at least one selected from the group consisting of phenol, hydroquinone, cresol, ethyl phenol, butyl phenol, octyl phenol, methoxyl phenol, ethoxyl phenol, naphthol, bisphenol-A, bisphenol-F, bisphenol-S and diphenol with at least one selected from the group consisting of formaldehyde, acetaldehyde, alkylaldehyde, glyoxal, salicylaldehyde, benzaldehyde and salicylaldehyde.

The foregoing phenolic resin may have its molecular weight ranging between 350 and 4,000; preferably ranging between 500 and 4,000; and most preferably ranging between 1,000 and 3,000.

The phosphorous-containing compound may be a derivative of DOPO ($C_{12}H_9PO_2$, 9,10-dihydro-9-oxa-10-phosphaphenanthrene 10-oxide), including at least one of 2-(6-oxid-6H-dibenz<c,e><1,2>oxa-phosphorin-6-yl)methanol (abbreviated as ODOPM) or 10-(2, 5-dihydroxyphenyl)-10H-9-oxa-10-phosphaphenantbrene-10-oxide (abbreviated as DOPO-HQ).

1. Preparation of ODOPM

By way of DOPO reacted with formaldehyde to produce a phosphorous-containing compound of ODOPM. For example, 324 g (1.5 mol) of DOPO is dissolved in cyclohexanol (500 ml) at 90° C. After DOPO is fully dissolved, 45 g (1.5 mol) of paraformaldehyde (PFA) is gradually added. For preventing violent exothermic reaction, the addition is performed over about 1 hour. After formaldehyde is added, the reaction temperature is increased to 110° C., and the reaction proceeds under nitrogen gas. Sampling is repeatedly conducted over the process of the reaction, and Gel Permeation Chromatography (GPC) is used to observe residual DOPO to determine whether the reaction is finished. After the reaction is finished, the ODOPM product can be obtained by removing the solvent. Then nuclear magnetic resonance (NMR) analysis of the product is performed, wherein a chemical shift of 4-4.5 represents signals from hydrogen atoms on CH2, about 5.5 represents signals from hydrogen atoms on OH functional groups, and between 7 and 8 represents signals form hydrogen atoms on benzene rings.

2. Preparation of DOPO-HQ

A commercially available DOPO-HQ (Nu-Tech Fine Chemical Co., Ltd., Product Name: NuFR DOPO-HQ) is used.

At step b) mentioned above, the phenolic resin and the phosphorous-containing compound may react in a relative equivalence ratio of 1:0.4 to 1:2, and preferably 1:0.6 to 1:1.5.

At step c) mentioned above, the catalyst is used in an amount of 1-10%, and preferably 3-5%, by weight of the final produced reactant.

The catalyst may be at least one selected from sulfuric acid, methanesulfonic acid, trifluoromethanesulfonic acid, p-toluene sulphonic acid, sodium acetate, potassium acetate, cobalt acetate, ferric acetate, zinc acetate and lead acetate, wherein cobalt acetate provides the best effect.

At step d) mentioned above, the water-carrying agent is used in an amount of 5-20%, and preferably 10-15%, by weight of the final produced reactant.

The water-carrying agent may be at least one selected from benzene, toluene, xylene, butanone, methyl isobutyl ketone, cyclohexanone and cyclohexanol, where in cyclohexanone and cyclohexanol provide the best water-carrying effect.

After completion of the reaction at step d) mentioned above, the product obtained at step d) is disabled in a solvent and then receives washing. Then a high-molecular-weight phenolic-type phosphorous curing agent can be obtained by removing the solvent.

The solvent used for washing may be at least one selected from benzene, toluene, xylene, butanone, methyl isobutyl ketone, cyclohexanone and cyclohexanol.

An exemplified preparation of the phenolic-type phosphorous curing agent of the invention is illustrated as follows:

phenolic resin, phosphorous-containing compound (ODOPM and DOPO) and 1-10 wt % of catalyst (cobalt acetate) are placed in a four-necked reactor equipped with a stirrer, a thermometer, a condenser and a nitrogen-feed device. 5-20 wt % of cyclohexanol is added as a water-carrying agent. The mixture is stirred to make the temperature increased to 170° C. After the reactant is dissolved, the temperature is slowly increased to 220° C. for reaction. A Dean-Stark apparatus is used to collect water generated in the reaction, and promote the reaction. During the reaction, LC is used to track the strength variation of ODOPM signals for providing an indicator for the residual ODOPM, so that the end of the reaction can be identified. The use of the water-carrying agent can significantly reduce the reaction time. The reaction time is dependent on the equivalent of the phosphorous compound, and is generally between 4 and 8 hours. Without using the water-carrying agent, the reaction time can be as long as 16-20 hours. After the reaction ends, the product is dissolved in a solvent made of cyclohexanol and xylene, and then receives washing. Afterward, the solvent is removed and the final phosphorous phenolic resin-based curing agent is obtained.

Preparation Example 1

228 g (equal to 1 equivalent, abbreviated as 1 Eq) of bisphenol-A (BPA), 492 g (2 Eq) of ODOPM and a proper amount of a catalyst (cobalt acetate) were placed into a four-necked reactor equipped with a stirrer, a thermometer, a condenser and a nitrogen-feed device. 10 wt % of cyclohexanol was added as a water-carrying agent. The mixture is stirred to make the temperature increased to 170° C. After the reactant is dissolved, the temperature is slowly increased to 220° C. for reaction. A Dean-Stark apparatus is used to collect water generated in the reaction, and promote the reaction. During the reaction, LC is used to track the strength variation of ODOPM signals for providing an indicator for the residual ODOPM, so that the end of the reaction can be identified. The reaction time lasted for 8 hours. After the reaction ends, the product is dissolved in a solvent made of cyclohexanol and xylene, and then receives washing. Afterward, the solvent is removed and the final product is obtained. The product is a BPA-type phosphorous curing agent S-1 having an equivalence ratio between BPA and ODOPM of 1:2, with its phosphorus content of 9.06%, OH equivalent of 342, and yield of 94.2%; FTIR results: phenolic hydroxyl: 3300 cm$^{-1}$; P═O: 1200 cm-1; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 2

Except that 240 g (1 Eq) of BPA-type phenolic resin (having a molecular weight of 500) was used to replace BPA used in Preparation Example 1, the rest parts of the reaction device and conditions were identical to those used in Preparation Example 1. The reaction time lasted for 8 hours. A phenolic-type phosphorous curing agent S-2 having an equivalence ratio between the phenolic resin and ODOPM of 1:2 was obtained, with its phosphorus content of 8.91%, OH equivalent of 348, and yield of 93.8%; FTIR results: phenolic hydroxyl: 3300 cm$^{-1}$; P═O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 3

Except that 240 g (1 Eq) of BPA-type phenolic resin (having a molecular weight of 1000) was used to replace BPA used in Preparation Example 1, and 98.4 g (0.4 Eq) of ODOPM was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-3 having an equivalence ratio between the phenolic resin and ODOPM of 1:0.4 was obtained, with its phosphorus content of 3.74%, OH equivalent of 166, and yield of 95.7%; FTIR results: phenolic hydroxyl: 3300 cm$^{-1}$; P═O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 4

Except that 240 g (1 Eq) of BPA-type phenolic resin (having a molecular weight of 1800) was used to replace BPA used in Preparation Example 1, and 147.6 g (0.6 Eq) of ODOPM was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-4 having an equivalence ratio between the phenolic resin and ODOPM of 1:0.6 was obtained, with its phosphorus content of 4.94%, OH equivalent of 188, and yield of 93.7%; FTIR results: phenolic hydroxyl: 3300 cm$^{-1}$; P═O: 1200 cm$^{-1}$; P—O—C(aryl): 922 cm-$^{1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 5

Except that 240 g (1 Eq) of BPA-type phenolic resin (having a molecular weight of 1800) was used to replace BPA used in Preparation Example 1, and 184.5 g (0.75 Eq) of ODOPM was used to replace the 2 equivalents of ODOPM used in Preparation Example 1, the rest parts of the reaction device and conditions were identical to those used in Preparation Example 1. The reaction time lasted for 5 hours. A phenolic-type phosphorous curing agent S-5 having an equivalence ratio between the phenolic resin and ODOPM of 1:0.75 was obtained, with its phosphorus content of 5.66%, OH equivalent of 206, and yield of 92.8%; FTIR results: phenolic hydroxyl: 3300 cm$^{-1}$; P═O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 6

Except that 240 g (1 Eq) of BPA-type phenolic resin (having a molecular weight of 1800) was used to replace BPA used in Preparation Example 1, and 369 g (1.5 Eq) of ODOPM was used to replace the 2 equivalents of ODOPM used in Preparation Example 1, the rest parts of the reaction device and conditions were identical to those used in Preparation Example 1. The reaction time lasted for 7 hours. A phenolic-type phosphorous curing agent S-6 having an equivalence ratio between the phenolic resin and ODOPM of 1:1.5 was obtained, with its phosphorus content of 7.99%, OH equivalent of 291, and yield of 91.3%; FTIR results: phenolic hydroxyl: 3300 cm$^{-1}$; P═O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 7

Except that 240 g (1 Eq) of BPA-type phenolic resin (having a molecular weight of 4000) was used to replace BPA used in Preparation Example 1, the rest parts of the reaction device and conditions were identical to those used in Preparation Example 1. The reaction time lasted for 8 hours. A phenolic-type phosphorous curing agent S-7 having an equivalence ratio between the phenolic resin and ODOPM of 1:2 was obtained, with its phosphorus content of 8.91%, OH equivalent of 348, and yield of 89.2%; FTIR results: phenolic hydroxyl: 3300 cm$^{-1}$; P=O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 8

Except that 182 g (1 Eq) of benzaldehyde-type phenolic resin (having a molecular weight of 1200) was used to replace BPA used in Preparation Example 1, and 98.4 g (0.4 Eq) of ODOPM was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-8 having an equivalence ratio between the phenolic resin and ODOPM of 1:0.4 was obtained, with its phosphorus content of 4.54%, OH equivalent of 137, and yield of 95.8%; FTIR results: phenolic hydroxyl: 3300 cm$^{-1}$; P=O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 9

Except that 198 g (1 Eq) of salicylaldehyde-type phenolic resin (having a molecular weight of 2000) was used to replace BPA used in Preparation Example 1, and 147.6 g (0.6 Eq) of ODOPM was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-9 having an equivalence ratio between the phenolic resin and ODOPM of 1:0.6 was obtained, with its phosphorus content of 5.56%, OH equivalent of 167, and yield of 94.5%; FTIR results: phenolic hydroxyl: 3300 cm$^{-1}$; P=O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 10

Except that 198 g (1 Eq) of hydroquinone-type phenolic resin (having a molecular weight of 2400) was used to replace BPA used in Preparation Example 1, and 184.5 g (0.75 Eq) of ODOPM was used to replace the 2 equivalents of ODOPM used in Preparation Example 1, the rest parts of the reaction device and conditions were identical to those used in Preparation Example 1. The reaction time lasted for 5 hours. A phenolic-type phosphorous curing agent S-10 having an equivalence ratio between the phenolic resin and ODOPM of 1:0.75 was obtained, with its phosphorus content of 6.30%, OH equivalent of 185, and yield of 94.9%; FTIR results: phenolic hydroxyl: 3300 cm$^{-1}$; P=O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 11

Except that 398 g (1 Eq) glyoxal-type phenolic resin (having a molecular weight of 1800) was used to replace BPA used in Preparation Example 1, and 246 g (1 Eq) ODOPM was used to replace the 2 equivalents of ODOPM used in Preparation Example 1, the rest parts of the reaction device and conditions were identical to those used in Preparation Example 1. The reaction time lasted for 6 hours. A phenolic-type phosphorous curing agent S-11 having an equivalence ratio between the phenolic resin and ODOPM of 1:1 was obtained, with its phosphorus content of 4.95%, OH equivalent of 157, and yield of 92.7%; FTIR results: phenolic hydroxyl: 3300 cm$^{-1}$; P=O: 1200 cm$^{-1}$; P—O—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-1.

Preparation Example 12

Except that 182 g (1 Eq) of benzaldehyde-type phenolic resin (having a molecular weight of 1200) was used to replace BPA used in Preparation Example 1, and 129.6 g (0.4 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-12 having an equivalence ratio between the phenolic resin and ODOPM of 1:0.6 was obtained, with its phosphorus content of 4.07%, OH equivalent of 217, and yield of 93.7%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-2.

Preparation Example 13

Except that 182 g (1 Eq) of benzaldehyde-type phenolic resin (having a molecular weight of 1200) was used to replace BPA used in Preparation Example 1, and 243 g (0.75 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 5 hours. A phenolic-type phosphorous curing agent S-13 having an equivalence ratio between the phenolic resin and ODOPM of 1:0.6 was obtained, with its phosphorus content of 5.63%, OH equivalent of 236, and yield of 92.8%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-2.

Preparation Example 14

Except that 198 g (1 Eq) of salicylaldehyde-type phenolic resin (having a molecular weight of 2000) was used to replace BPA used in Preparation Example 1, and 194.4 g (0.6 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 4 hours. A phenolic-type phosphorous curing agent S-14 having an equivalence ratio between the phenolic resin and DOPO-HQ equivalence ratio of 1:0.6 was obtained, with its phosphorus content of 4.87%, OH equivalent of 147, and yield of 91.8%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-3.

Preparation Example 15

Except that 198 g (1 Eq) of salicylaldehyde-type phenolic resin (having a molecular weight of 2000) was used to replace BPA used in Preparation Example 1, and 324 g (1 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 6 hours. A phenolic-type phosphorous curing agent S-15 having an equivalence ratio between the phenolic resin and DOPO-HQ equivalence ratio of 1:1 was obtained, with its phosphorus content of 6.15%, OH equivalent of 168, and yield of 90.7%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-3.

Preparation Example 16

Except that 198 g (1 Eq) of hydroquinone-type phenolic resin (having a molecular weight of 2400) was used to replace BPA used in Preparation Example 1, and 243 g (0.75 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 5 hours. A phenolic-type phosphorous curing agent S-16 having an equivalence ratio between the phenolic resin and DOPO-HQ equivalence ratio of 1:0.75 was obtained, with its phosphorus content of 5.44%, OH equivalent of 155, and yield of 92.3%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-4.

Preparation Example 17

Except that 198 g (1 Eq) of hydroquinone-type phenolic resin (having a molecular weight of 2400) was used to replace BPA used in Preparation Example 1, and 324 g (1 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 6 hours. A phenolic-type phosphorous curing agent S-17 having an equivalence ratio between the phenolic resin and DOPO-HQ equivalence ratio of 1:1 was obtained, with its phosphorus content of 6.15%, OH equivalent of 168, and yield of 91.5%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-4.

Preparation Example 18

Except that 398 g (1 Eq) of glyoxal-type phenolic resin (having a molecular weight of 1800) was used to replace BPA used in Preparation Example 1, and 324 g (1 Eq) of DOPO-HQ (Nu-Tech Fine Chemical Co., Ltd., Product Name: NuFRDOPO-HQ) was used to replace the 2 equivalents of ODOPM used in Preparation Example 1, the rest parts of the reaction device and conditions were identical to those used in Preparation Example 1. The reaction time lasted for 6 hours. A phenolic-type phosphorous curing agent S-18 having an equivalence ratio between the phenolic resin and DOPO-HQ equivalence ratio of 1:1 was obtained, with its phosphorus content of 4.40%, OH equivalent of 141, and yield of 90.1%; FTIR results: phenolic hydroxyl: 3300 cm$^{-1}$; P=O: 1200 cm$^{-1}$; PO—C(aryl): 922 cm$^{-1}$/1115 cm$^{-1}$; P—C(aryl): 1428 cm$^{-1}$/1476 cm$^{-1}$. The preparing equivalent and physical properties of the phosphorous curing agent are detailed in Table 1-5.

TABLE 1-1

Preparing Equivalents and Physical Properties of Phosphorous Curing Agents

| Item | BPA | BPA-Type Phenolic Resin Molecular Weight | | | | ODOPM | OH Eq | Phosphorus Content (%) | Product |
| --- | --- | --- | --- | --- | --- | --- | --- | --- | --- |
| | | 500 | 1000 | 1800 | 4000 | | | | |
| Preparation Example 1 | 1 Eq | | | | | 2 Eq | 342 | 9.06 | S-1 |
| Preparation Example 2 | | 1 Eq | | | | 2 Eq | 348 | 8.91 | S-2 |
| Preparation Example 3 | | | 1 Eq | | | 0.4 Eq | 166 | 3.74 | S-3 |
| Preparation Example 4 | | | | 1 Eq | | 0.6 Eq | 188 | 4.94 | S-4 |
| Preparation Example 5 | | | | 1 Eq | | 0.75 Eq | 206 | 5.66 | S-5 |
| Preparation Example 6 | | | | 1 Eq | | 1.5 Eq | 291 | 7.99 | S-6 |
| Preparation Example 7 | | | | | 1 Eq | 2 Eq | 348 | 8.91 | S-7 |
| Preparation Example 8 | 1 Eq (benzaldehyde-type phenolic resin, molecular weight = 1200) | | | | | 0.4 Eq | 137 | 4.54 | S-8 |
| Preparation Example 9 | 1 Eq (salicyldehyde-type phenolic resin, molecular weight = 2000) | | | | | 0.6 Eq | 167 | 5.56 | S-9 |

TABLE 1-1-continued

Preparing Equivalents and Physical Properties of Phosphorous Curing Agents

| Item | BPA | BPA-Type Phenolic Resin Molecular Weight | | | | ODOPM | OH Eq | Phosphorus Content (%) | Product |
| --- | --- | --- | --- | --- | --- | --- | --- | --- | --- |
| | | 500 | 1000 | 1800 | 4000 | | | | |
| Preparation Example 10 | | | | | 1 Eq (hydroquinone-type phenolic resin, molecular weight = 2400) | 0.75 Eq | 185 | 6.30 | S-10 |
| Preparation Example 11 | | | | | 1 Eq (glyoxal-type phenolic resin, molecular weight = 800) | 1 Eq | 157 | 4.95 | S-11 |

TABLE 1-2

Preparing Equivalents and Physical Properties of Phosphorous Curing Agents

| Item | benzaldehyde-type phenolic resin (molecular weight = 1200) | DOPO-HQ | OH Eq | Phosphorus Content (%) | Product |
| --- | --- | --- | --- | --- | --- |
| Preparation Example 12 | 1 Eq | 0.4 Eq | 217 | 4.07 | S-12 |
| Preparation Example 13 | 1 Eq | 0.75 Eq | 236 | 5.63 | S-13 |

TABLE 1-3

Preparing Equivalents and Physical Properties of Phosphorous Curing Agents

| Item | salicylaldehyde-type phenolic resin (molecular weight = 2000) | DOPO-HQ | OH Eq | Phosphorous Content (%) | Product |
| --- | --- | --- | --- | --- | --- |
| Preparation Example 14 | 1 Eq | 0.6 Eq | 147 | 4.87 | S-14 |
| Preparation Example 15 | 1 Eq | 1 Eq | 168 | 6.15 | S-15 |

TABLE 1-4

Preparing Equivalents and Physical Properties of Phosphorous Curing Agents

| Item | hydroquinone-type phenolic resin (molecular weight = 2400) | DOPO-HQ | OH Eq | Phosphorus Content (%) | Product |
| --- | --- | --- | --- | --- | --- |
| Preparation Example 16 | 1 Eq | 0.75 Eq | 155 | 5.44 | S-16 |
| Preparation Example 17 | 1 Eq | 1 Eq | 168 | 6.15 | S-17 |
| Preparation Example 18 | 1 Eq (Glyoxal-Type Phenolic Resin, Molecular Weight = 1800) | 1 Eq | 141 | 4.40 | S-18 |

Example 1

Solid constituents including 100 weight parts of multi-functional epoxy resin (Nanya Plastics Corporation, Product Name: 65 weight parts of NPPN-433 and 35 weight parts of NPPN-438), 31.8 weight parts of phenolic-type phosphorous curing agent S-2, 43.8 weight parts of phenolic resin (Nanya Plastics Corporation, Product Name: NPEH-720H) and 1.7 weight parts of 2-MI were dissolved into 135 weight parts of PM and 37.6 weight parts of Al(OH)$_3$ as well as 37.6 weight parts of SiO$_2$ were blended into the solution to obtain a halogen-free nonflammable epoxy resin composition (phosphorus content 1.61%). A copper clad laminate was prepared according to the known CCL manufacturing process, and the CCL was measured for physical properties. The prepreg formula and physical properties of the laminate are detailed in Table 2 and Table 3.

A sheet of fiberglass fabric (Nanya Plastics Corporation, Model 7628) was impregnated with the foregoing liquid resin, and dried at 170° C. (in a dipper) for several minutes. The drying time was adjusted to make the minimal melt viscosity of the prepreg between 2000 and 10000 poise. The sheet was then sandwiched in two pieces of 35 μm-thick copper foil. The combination was heated to 185° C. from 85° C. under 30 kg/cm$^2$ and 5° C./min, and was then held at 120 minutes before slowly cooled to 130° C., so as to obtain a copper clad laminate (CCL). The CCL such produced was measured for physical properties. The prepreg formula and physical properties of the laminate are detailed in Table 2 and Table 3.

Example 2

Solid constituents including 100 weight parts of multi-functional epoxy resin (Nanya Plastics Corporation, Product Name: 65 weight parts of NPPN433 and 35 weight parts of NPPN438), 76.2 weight parts of phenolic-type phosphorous curing agent S-3 and 1.7 weight parts of 2-MI (2-methyl-imidazole) were dissolved into 135.2 weight parts of PM (propylene glycol monomethyl ether) and 37.7 weight parts of Al(OH)$_3$ as well as 37.7 weight parts of SiO$_2$ were blended into the solution to obtain a halogen-free nonflammable epoxy resin composition (phosphorus content 1.61%). The rest parts of the CCL manufacturing process were identical to those implemented in Example 1. The CCL such prepared was measured for physical properties. The prepreg formula and physical properties of the laminate are detailed in Table 2 and Table 3.

Example 3

Solid constituents including 100 weight parts of multi-functional epoxy resin (Nanya Plastics Corporation, Product Name: 65 weight parts of NPPN-433 and 35 weight parts of NPPN-438), 60 weight parts of phenolic-type phosphorous curing agent S-4, 16.4 weight parts of phenolic resin (Nanya Plastics Corporation, Product Name: NPEH-720) and 1.7 weight parts of 2-MI were dissolved into 135.7 weight parts of PM and 37.8 weight parts of Al(OH)$_3$ as well as 37.8 weight parts of SiO$_2$ were blended into the solution to obtain a halogen-free nonflammable epoxy resin composition (phosphorus content 1.68%). The rest parts of the CCL manufacturing process were identical to those implemented in Example 1. The CCL such prepared was measured for physical properties. The prepreg formula and physical properties of the laminate are detailed in Table 2 and Table 3.

Example 4

Solid constituents including 100 weight parts of multifunctional epoxy resin (Nanya Plastics Corporation, Product Name: 65 weight parts of NPPN-433 and 35 weight parts of NPPN-438), 51.7 weight parts of phenolic-type phosphorous curing agent S-5, 24.6 weight parts of phenolic resin (Nanya Plastics Corporation, Product Name: NPEH-720) and 1.7 weight parts of 2-MI were dissolved into 135.6 weight parts of PM and 37.8 weight parts of $Al(OH)_3$ as well as 37.8 weight parts of $SiO_2$ were blended into the solution to obtain a halogen-free nonflammable epoxy resin composition (phosphorus content 1.66%). The rest parts of the CCL manufacturing process were identical to those implemented in Example 1. The CCL such prepared was measured for physical properties. The prepreg formula and physical properties of the laminate are detailed in Table 2 and Table 3.

Example 5

Solid constituents including 100 weight parts of multifunctional epoxy resin (Nanya Plastics Corporation, Product Name: 65 weight parts of NPPN-433 and 35 weight parts of NPPN-438), 37.2 weight parts of phenolic-type phosphorous curing agent S-6, 39.4 weight parts of phenolic resin (Nanya Plastics Corporation, Product Name: NPEH-720) and 1.7 weight parts of 2-MI were dissolved into 135.8 weight parts of PM and 37.8 weight parts of $Al(OH)_3$ as well as 37.8 weight parts of $SiO_2$ were blended into the solution to obtain a halogen-free nonflammable epoxy resin composition (phosphorus content 1.68%). The rest parts of the CCL manufacturing process were identical to those implemented in Example 1. The CCL such prepared was measured for physical properties. The prepreg formula and physical properties of the laminate are detailed in Table 2 and Table 3.

Example 6

Solid constituents including 100 weight parts of multifunctional epoxy resin (Nanya Plastics Corporation, Product Name: 65 weight parts of NPPN-433 and 35 weight parts of NPPN-438), 31.7 weight parts of phenolic-type phosphorous curing agent S-7, 43.8 weight parts of phenolic resin (Nanya Plastics Corporation, Product Name: NPEH-720) and 1.7 weight parts of 2-MI were dissolved into 135 weight parts of PM and 37.6 weight parts of $Al(OH)_3$ as well as 37.6 weight parts of $SiO_2$ were blended into the solution to obtain a halogen-free nonflammable epoxy resin composition (phosphorus content 1.61%). The rest parts of the CCL manufacturing process were identical to those implemented in Example 1. The CCL such prepared was measured for physical properties. The prepreg formula and physical properties of the laminate are detailed in Table 2 and Table 3.

Example 7

Solid constituents including 100 weight parts of multifunctional epoxy resin (Nanya Plastics Corporation, Product Name: 65 weight parts of NPPN-433 and 35 weight parts of NPPN-438), 58.1 weight parts of phenolic-type phosphorous curing agent S-8, 3.8 weight parts of phenolic resin (Nanya Plastics Corporation, Product Name: NPEH-720) and 1.7 weight parts of 2-MI were dissolved into 124.6 weight parts of PM and 34.7 weight parts of $Al(OH)_3$ as well as 34.7 weight parts of $SiO_2$ were blended into the solution to obtain a halogen-free nonflammable epoxy resin composition (phosphorus content 1.63%). The rest parts of the CCL manufacturing process were identical to those implemented in Example 1. The CCL such prepared was measured for physical properties. The prepreg formula and physical properties of the laminate are detailed in Table 2 and Table 3.

Example 8

Solid constituents including 100 weight parts of multifunctional epoxy resin (Nanya Plastics Corporation, Product Name: 65 weight parts of NPPN-433 and 35 weight parts of NPPN-438), 49.5 weight parts of phenolic-type phosphorous curing agent S-9, 19.2 weight parts of phenolic resin (Nanya Plastics Corporation, Product Name: NPEH-720) and 1.7 weight parts of 2-MI were dissolved into 129.7 weight parts of PM, and 36.1 weight parts of $Al(OH)_3$ as well as 36.1 weight parts of $SiO_2$ were blended into the solution to obtain a halogen-free nonflammable epoxy resin composition (phosphorus content 1.63%). The rest parts of the CCL manufacturing process were identical to those implemented in Example 1. The CCL such prepared was measured for physical properties. The prepreg formula and physical properties of the laminate are detailed in Table 2 and Table 3.

Example 9

Solid constituents including 100 weight parts of multifunctional epoxy resin (Nanya Plastics Corporation, Product Name: 65 weight parts of NPPN-433 and 35 weight parts of NPPN-438), 44.7 weight parts of phenolic-type phosphorous curing agent S-10, 25.7 weight parts of phenolic resin (Nanya Plastics Corporation, Product Name: NPEH-720) and 1.7 weight parts of 2-MI were dissolved into 131.1 weight parts of PM and 36.5 weight parts of $Al(OH)_3$ as well as 36.5 weight parts of $SiO_2$ were blended into the solution to obtain a halogen-free nonflammable epoxy resin composition (phosphorus content 1.65%). The rest parts of the CCL manufacturing process were identical to those implemented in Example 1. The CCL such prepared was measured for physical properties. The prepreg formula and physical properties of the laminate are detailed in Table 2 and Table 3.

Example 10

Solid constituents including 100 weight parts of multifunctional epoxy resin (Nanya Plastics Corporation, Product Name: 65 weight parts of NPPN-433 and 35 weight parts of NPPN-438), 55.9 weight parts of phenolic-type phosphorous curing agent S-11, 12 weight parts of phenolic resin (Nanya Plastics Corporation, Product Name: NPEH-720) and 1.7 weight parts of 2-MI were dissolved into 129.1 weight parts of PM and 36 weight parts of $Al(OH)_3$ as well as 36 weight parts of $SiO_2$ were blended into the solution to obtain a halogen-free nonflammable epoxy resin composition (phosphorus content 1.65%). The rest parts of the CCL manufacturing process were identical to those implemented in Example 1. The CCL such prepared was measured for physical properties. The prepreg formula and physical properties of the laminate are detailed in Table 2 and Table 3.

Example 11

Solid constituents including 100 weight parts of multifunctional epoxy resin (Nanya Plastics Corporation, Product Name: 65 weight parts of NPPN-433 and 35 weight parts of NPPN-438), 74.2 weight parts of phenolic-type phosphorous curing agent S-12, 13.7 weight parts of phenolic resin (Nanya Plastics Corporation, Product Name: NPEH-720) and 1.7 weight parts of 2-MI were dissolved into 144.5 weight parts of PM and 40.3 weight parts of Al(OH)$_3$ as well as 40.3 weight parts of SiO$_2$ were blended into the solution to obtain a halogen-free nonflammable epoxy resin composition (phosphorus content 1.61%). The rest parts of the CCL manufacturing process were identical to those implemented in Example 1. The CCL such prepared was measured for physical properties. The prepreg formula and physical properties of the laminate are detailed in Table 2 and Table 3.

Example 12

Solid constituents including 100 weight parts of multi-functional epoxy resin (Nanya Plastics Corporation, Product Name: 65 weight parts of NPPN-433 and 35 weight parts of NPPN-438), 53.8 weight parts of phenolic-type phosphorous curing agent S-13, 27.4 weight parts of phenolic resin (Nanya Plastics Corporation, Product Name: NPEH-720) and 1.7 weight parts of 2-MI were dissolved into 127.1 weight parts of PM and 38.8 weight parts of Al(OH)$_3$ and as well as 38.8 weight parts of SiO$_2$ were blended into the solution to obtain a halogen-free nonflammable epoxy resin composition (phosphorus content 1.67%). The rest parts of the CCL manufacturing process were identical to those implemented in Example 1. The CCL such prepared was measured for physical properties. The prepreg formula and physical properties of the laminate are detailed in Table 2 and Table 3.

Example 13

Solid constituents including 100 weight parts of multi-functional epoxy resin (Nanya Plastics Corporation, Product Name: 65 weight parts of NPPN-433 and 35 weight parts of NPPN-438), 57 weight parts of phenolic-type phosphorous curing agent S-14, 8.2 weight parts of phenolic resin (Nanya Plastics Corporation, Product Name: NPEH-720) and 1.7 weight parts of 2-MI were dissolved into 127.1 weight parts of PM and 35.4 weight parts of Al(OH)$_3$ as well as 35.4 weight parts of SiO$_2$ were blended into the solution to obtain a halogen-free nonflammable epoxy resin composition (phosphorus content 1.68%). The rest parts of the CCL manufacturing process were identical to those implemented in Example 1. The CCL such prepared was measured for physical properties. The prepreg formula and physical properties of the laminate are detailed in Table 2 and Table 3.

Example 14

Solid constituents including 100 weight parts of multi-functional epoxy resin (Nanya Plastics Corporation, Product Name: 65 weight parts of NPPN-433 and 35 weight parts of NPPN-438), 46 weight parts of phenolic-type phosphorous curing agent S-15, 21.9 weight parts of phenolic resin (Nanya Plastics Corporation, Product Name: NPEH-720) and 1.6 weight parts of 2-MI were dissolved into 129.1 weight parts of PM and 36 weight parts of Al(OH)$_3$ as well as 36 weight parts of SiO$_2$ were blended into the solution to obtain a halogen-free nonflammable epoxy resin composition (phosphorus content 1.68%). The rest parts of the CCL manufacturing process were identical to those implemented in Example 1. The CCL such prepared was measured for physical properties. The prepreg formula and physical properties of the laminate are detailed in Table 2 and Table 3.

Example 15

Solid constituents including 100 weight parts of multi-functional epoxy resin (Nanya Plastics Corporation, Product Name: 65 weight parts of NPPN-433 and 35 weight parts of NPPN-438), 50.9 weight parts of phenolic-type phosphorous curing agent S-16, 15.3 weight parts of phenolic resin (Nanya Plastics Corporation, Product Name: NPEH-720) and 1.6 weight parts of 2-MI were dissolved into 127.9 weight parts of PM and 35.6 weight parts of Al(OH)$_3$ as well as 35.6 weight parts of SiO$_2$ were blended into the solution to obtain a halogen-free nonflammable epoxy resin composition (phosphorus content 1.67%). The rest parts of the CCL manufacturing process were identical to those implemented in Example 1. The CCL such prepared was measured for physical properties. The prepreg formula and physical properties of the laminate are detailed in Table 2 and Table 3.

Example 16

Solid constituents including 100 weight parts of multi-functional epoxy resin (Nanya Plastics Corporation, Product Name: 65 weight parts of NPPN-433 and 35 weight parts of NPPN-438), 46 weight parts of phenolic-type phosphorous curing agent S-17, 21.9 weight parts of phenolic resin (Nanya Plastics Corporation, Product Name: NPEH-720) and 1.6 weight parts of 2-MI were dissolved into 129.1 weight parts of PM and 36 weight parts of Al(OH)$_3$ as well as 36 weight parts of SiO$_2$ were blended into the solution to obtain a halogen-free nonflammable epoxy resin composition (phosphorus content 1.68%). The rest parts of the CCL manufacturing process were identical to those implemented in Example 1. The CCL such prepared was measured for physical properties. The prepreg formula and physical properties of the laminate are detailed in Table 2 and Table 3.

Example 17

Solid constituents including 100 weight parts of multi-functional epoxy resin (Nanya Plastics Corporation, Product Name: 65 weight parts of NPPN-433 and 35 weight parts of NPPN-438), 61.1 weight parts of phenolic-type phosphorous curing agent S-18, 2.7 weight parts of phenolic resin (Nanya Plastics Corporation, Product Name: NPEH-720) and 1.6 weight parts of 2-MI were dissolved into 126 weight parts of PM and 35.1 weight parts of Al(OH)$_3$ as well as 35.1 weight parts of SiO$_2$ were blended into the solution to obtain a halogen-free nonflammable epoxy resin composition (phosphorus content 1.64%). The rest parts of the CCL manufacturing process were identical to those implemented in Example 1. The CCL such prepared was measured for physical properties. The prepreg formula and physical properties of the laminate are detailed in Table 2 and Table 3.

Comparative Example 1

Solid constituents including 100 weight parts of multi-functional epoxy resin (Nanya Plastics Corporation, Product Name: 65 weight parts of NPPN-433 and 35 weight parts of NPPN-438), 54.7 weight parts of phenolic resin (Nanya Plastics Corporation, Product Name: NPEH-720, Molecular Weight=1800), 1.6 weight parts of 2-MI were dissolved into 119 weight parts of PM and 33.2 weight parts of Al(OH)$_3$ as well as 33.2 weight parts of SiO$_2$ were blended into the solution to obtain an epoxy resin composition. The rest parts of the CCL manufacturing process were identical to those implemented in Example 1. The CCL such prepared was measured for physical properties. The prepreg formula and physical properties of the laminate are detailed in Table 2 and Table 3.

Comparative Example 2

Solid constituents including 100 weight parts of multi-functional epoxy resin (Nanya Plastics Corporation, Product Name: 65 weight parts of NPPN-433 and 35 weight parts of NPPN-438), 31.2 weight parts of phenolic-type phosphorous curing agent S-1, 43.8 weight parts of phenolic resin (Nanya Plastics Corporation, Product Name: NPEH-720) and 1.7 weight parts of 2-MI were dissolved into 134.6 weight parts of PM and 37.5 weight parts of Al(OH)$_3$ as well as 37.5 weight parts of SiO$_2$ were blended into the solution to obtain a halogen-free nonflammable epoxy resin composition (phosphorus content 1.62%). The rest parts of the CCL manufacturing process were identical to those implemented in Example 1. The CCL such prepared was measured for physical properties. The prepreg formula and physical properties of the laminate are detailed in Table 2 and Table 3.

Comparative Example 3

Solid constituents including 100 weight parts of multi-functional epoxy resin (Nanya Plastics Corporation, Product Name: 65 weight parts of NPPN-433 and 35 weight parts of NPPN-438), 23.4 weight parts of phenolic-type phosphorous curing agent S-1, 13.4 weight parts of phenolic-type phosphorous curing agent S-3, 21.9 weight parts of phenolic resin (Nanya Plastics Corporation, Product Name: NPEH-720H) and 1.6 weight parts of 2-MI were dissolved into 111.8 weight parts of PM and 31.1 weight parts of Al(OH)$_3$ as well as 31.1 weight parts of SiO$_2$ were blended into the solution to obtain a halogen-free nonflammable epoxy resin composition (phosphorus content 1.65%). The rest parts of the CCL manufacturing process were identical to those implemented in Example 1. The CCL such prepared was measured for physical properties. The prepreg formula and physical properties of the laminate are detailed in Table 2 and Table 3.

Comparative Example 4

Solid constituents including 100 weight parts of multi-functional epoxy resin (Nanya Plastics Corporation, Product Name: 65 weight parts of NPPN-433 and 35 weight parts of NPPN-438), 23.4 weight parts of phenolic-type phosphorous curing agent S-1, 11.1 weight parts of phenolic-type phosphorous curing agent S-5, 30.1 weight parts of phenolic resin (Nanya Plastics Corporation, Product Name: NPEH-720H) and 1.7 weight parts of 2-MI were dissolved into 118.1 weight parts of PM and 32.9 weight parts of Al(OH)$_3$ as well as 32.9 weight parts of SiO$_2$ were blended into the solution to obtain a halogen-free nonflammable epoxy resin composition (phosphorus content 1.67%). The rest parts of the CCL manufacturing process were identical to those implemented in Example 1. The CCL such prepared was measured for physical properties. The prepreg formula and physical properties of the laminate are detailed in Table 2 and Table 3.

Results

According to the data of Examples 1-17 and Comparative Example 1-4 as shown in Table 2, the following conclusion can be formed:

1. It is learned from Example 1 through Example 17 that varnish compositions having phosphorus contents ranging between 1.6 and 1.7% made by blending the phenolic-type phosphorous curing agents S-2-S-18 into 65 weight parts of NPPN-433 and 35 weight parts of NPPN-438, respectively, made the resultant laminate had its glass transition temperature (Tg) increasing with the molecular weight of the phenolic resin used for preparing the phosphorous curing agent, and provided excellent Tg level and good peel strength as well as heat tolerance.

As compared to the epoxy resin composition of Comparative Example 1 that contained no phosphorous curing agent, the halogen-free, flame-resist epoxy resin compositions of Examples 1-14 provided better flame resistance.

2. From Comparative Example 2 it is learned that when BPA-type phosphorous curing agent S-1 was used as the curing agent for epoxy resin, although the epoxy resin composition of Comparative Example 2 provided excellent flame resistance, it failed to support excellent glass transition temperature (Tg), peel strength and heat tolerance as required by laminate substrates.

3. From Comparative Examples 3 and 4 it is learned that when BPA-type phosphorous curing agent and phenolic-type phosphorous curing agents were used together as the curing agents for epoxy resin, although the epoxy resin compositions of Comparative Examples 3 and 4 composition displayed excellent flame resistance, the resultant laminate substrates thereof were inferior in Tg, peel strength and heat tolerance as compared to those of Examples 1-17 of the present invention. Although the properties significantly improved with the increase of the molecular weight of the phenolic-type phosphorous curing agent or with the increase of equivalence ratio of the phenolic-type phosphorous curing agent, the optimal results appeared when the phenolic-type phosphorous curing agent was used alone as the curing agent for epoxy resin. The phenolic-type phosphorous curing agent, when used alone to react with epoxy resin for curing, as compared to when used together with a BPA-type phosphorous curing agent to react with epoxy resin for curing, can achieve better molecular arrangement, so as to increase crosslink density, allowing the cured epoxy resin material to have better glass transition temperature (Tg), peel strength and heat tolerance.

TABLE 2

Prepreg Formulas of Examples and Comparative Examples

| | Epoxy Resin | | Curing Agent | | Accelerator | Filler | | Solvent | Phosphorus |
| | NPPN | | Phosphorous | | | | | | |
| Item | 433 | 438 | curing agent | NPEH-720 | 2-MI | Al(OH)$_3$ | SiO$_2$ | PM | Content (%) |
|---|---|---|---|---|---|---|---|---|---|
| Example 1 | 65 | 35 | 31.8 | 43.8 | 1.7 | 37.6 | 37.6 | 135 | 1.61 |
| Example 2 | 65 | 35 | 76.2 | — | 1.7 | 37.7 | 37.7 | 135.2 | 1.61 |
| Example 3 | 65 | 35 | 60 | 16.4 | 1.7 | 37.8 | 37.8 | 135.7 | 1.68 |
| Example 4 | 65 | 35 | 51.7 | 24.6 | 1.7 | 37.8 | 37.8 | 135.6 | 1.66 |
| Example 5 | 65 | 35 | 37.2 | 39.4 | 1.7 | 37.8 | 37.8 | 135.8 | 1.68 |
| Example 6 | 65 | 35 | 31.7 | 43.8 | 1.7 | 37.6 | 37.6 | 135 | 1.61 |

TABLE 2-continued

Prepreg Formulas of Examples and Comparative Examples

| | Epoxy Resin | | Curing Agent | | Accelerator | Filler | | Solvent | Phosphorus |
| | NPPN | | Phosphorous | | | | | | |
| Item | 433 | 438 | curing agent | NPEH-720 | 2-MI | Al(OH)$_3$ | SiO$_2$ | PM | Content (%) |
|---|---|---|---|---|---|---|---|---|---|
| Example 7 | 65 | 35 | 58.1 | 3.8 | 1.7 | 34.7 | 34.7 | 124.6 | 1.63 |
| Example 8 | 65 | 35 | 45.9 | 19.2 | 1.7 | 36.1 | 36.1 | 129.7 | 1.63 |
| Example 9 | 65 | 35 | 44.7 | 25.7 | 1.7 | 36.5 | 36.5 | 131.1 | 1.65 |
| Example 10 | 65 | 35 | 55.9 | 12 | 1.7 | 36 | 36 | 129.1 | 1.65 |
| Example 11 | 65 | 35 | 74.2 | 13.7 | 1.7 | 40.3 | 40.3 | 144.5 | 1.61 |
| Example 12 | 65 | 35 | 53.8 | 27.4 | 1.7 | 38.8 | 38.8 | 139.4 | 1.67 |
| Example 13 | 65 | 35 | 57 | 8.2 | 1.7 | 35.4 | 35.4 | 127.1 | 1.68 |
| Example 14 | 65 | 35 | 46 | 21.9 | 1.6 | 36 | 36 | 129.1 | 1.68 |
| Example 15 | 65 | 35 | 50.9 | 15.3 | 1.6 | 35.6 | 35.6 | 127.9 | 1.67 |
| Example 16 | 65 | 35 | 46 | 21.9 | 1.6 | 36 | 36 | 129.1 | 1.68 |
| Example 17 | 65 | 35 | 61.1 | 2.7 | 1.6 | 35.1 | 35.1 | 126 | 1.64 |
| Comparative Example 1 | 65 | 35 | — | 54.7 | 1.6 | 33.2 | 33.2 | 119 | — |
| Comparative Example 2 | 65 | 35 | 31.2 | 43.8 | 1.7 | 37.5 | 37.5 | 134.6 | 1.62 |
| Comparative Example 3 | 65 | 35 | 36.8 | 21.9 | 1.6 | 31.1 | 31.1 | 111.8 | 1.65 |
| Comparative Example 4 | 65 | 35 | 34.5 | 30.1 | 1.7 | 32.9 | 32.9 | 118.1 | 1.67 |

TABLE 3

Physical Properties of Laminate Substrates of Examples and Comparative Examples

| Item | Thickness (mm) | Copper Foil's Peel Strength (lb/in)*[1] | Glass Transition Temperature (° C., DMA)*[2] | Water Absorption (%)*[3] after treated in a pressure cooker for 0.5 hour | 288° C. Solder Heat Resistance (minute)*[4] | flame resistance (UL-94)*[5] |
|---|---|---|---|---|---|---|
| Example 1 | 1.62 | 8.3 | 185 | 0.17 | >10 min | V-0 |
| Example 2 | 1.58 | 8.5 | 187 | 0.17 | >10 min | V-0 |
| Example 3 | 1.61 | 8.8 | 188 | 0.17 | >10 min | V-0 |
| Example 4 | 1.59 | 8.9 | 189 | 0.18 | >10 min | V-0 |
| Example 5 | 1.58 | 8.9 | 189 | 0.20 | >10 min | V-0 |
| Example 6 | 1.62 | 9.2 | 192 | 0.20 | >10 min | V-0 |
| Example 7 | 1.62 | 8.7 | 187 | 0.17 | >10 min | V-0 |
| Example 8 | 1.61 | 8.9 | 188 | 0.18 | >10 min | V-0 |
| Example 9 | 1.60 | 8.8 | 189 | 0.19 | >10 min | V-0 |
| Example 10 | 1.62 | 9.1 | 190 | 0.19 | >10 min | V-0 |
| Example 11 | 1.61 | 9.0 | 188 | 0.17 | >10 min | V-0 |
| Example 12 | 1.63 | 9.1 | 189 | 0.18 | >10 min | V-0 |
| Example 13 | 1.59 | 9.2 | 191 | 0.19 | >10 min | V-0 |
| Example 14 | 1.61 | 9.2 | 191 | 0.20 | >10 min | V-0 |
| Example 15 | 1.59 | 9.2 | 192 | 0.18 | >10 min | V-0 |
| Example 16 | 1.60 | 9.3 | 192 | 0.19 | >10 min | V-0 |
| Example 17 | 1.62 | 9.2 | 191 | 0.19 | >10 min | V-0 |
| Comparative Example 1 | 1.61 | 8.2 | 177 | 0.17 | >10 min | V-1 |
| Comparative Example 2 | 1.59 | 7.2 | 157 | 0.25 | 3 min | V-0 |
| Comparative Example 3 | 1.61 | 7.6 | 168 | 0.23 | 5 min | V-0 |
| Comparative Example 4 | 1.62 | 7.9 | 174 | 0.22 | 8 min | V-0 |

Note:
[1] Tests were performed using a copper foil peel strength tester.
[2] Tests were performed using a dynamic mechanical analyzer (DMA).
[3] Samples were heated in a 2 atm pressure cooker at 120° C. for 30 minutes.
[4] Samples were heated in a 2 atm pressure cooker at 120° C. for 30 minutes and then immersed into a solder pot at 288° C. The time before each sample delaminated was recorded.
[5] Flame retardance of samples were determined according to the standard method described in UL-94.

What is claimed is:

1. A phenolic-type phosphorous curing agent, having a molecular weight ranging between 550 and 12000, having a phosphorus content ranged between 3.74% and 9.06%, being halogen-free and nonflammable, and having a chemical structure described as chemical structure formulas (I), (II), (III), (IV) or (V):

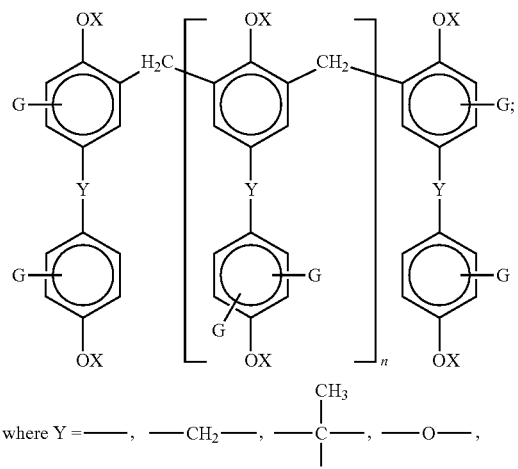
(I)

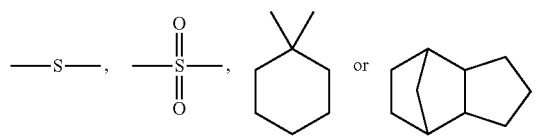

X=H; n is a positive integer greater than zero, and has a value determined by the molecular weight;

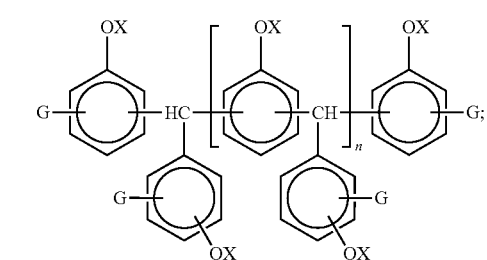
(II)

where, X=H; n is a positive integer greater than zero, and has a value determined by the molecular weight;

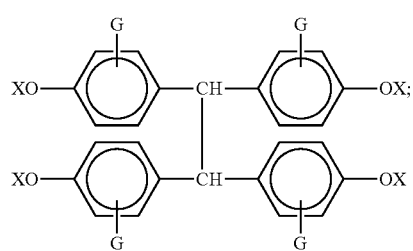
(III)

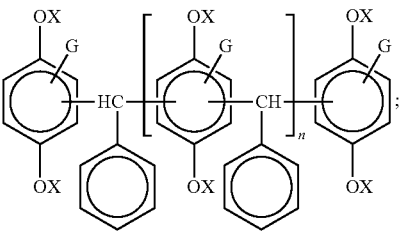
(IV)

where, X=H; n is a positive integer greater than zero, and has a value determined by the molecular weight;

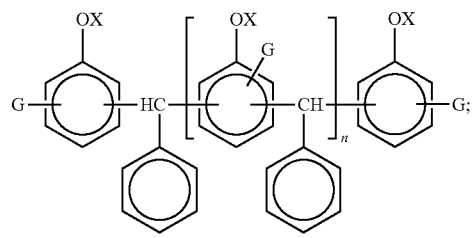
(V)

where, X=H; n is a positive integer greater than zero, and has a value determined by the molecular weight;
and G in the above chemical structures (I)-(V) is $G^1$ or $G^2$:

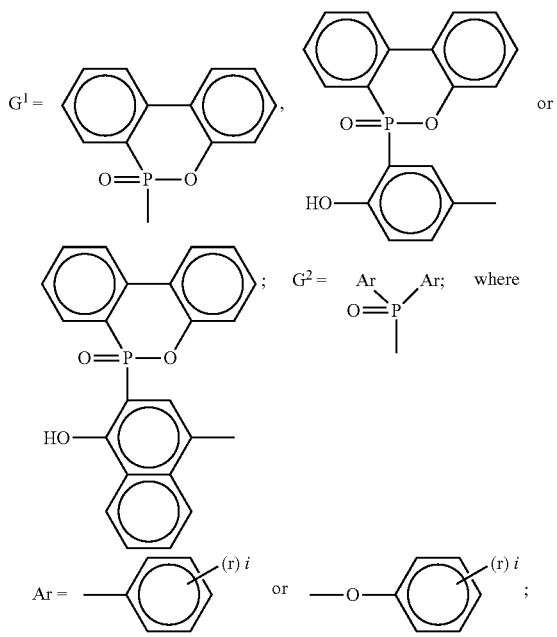

$r$ = H, $C_1$-$C_8$ or aryl;
$i$ = 0-5.

2. A process for producing the phenolic-type phosphorous curing agent of claim 1, including:
 a) selecting ODOPM or DOPO-HQ as a phosphorous-containing compound;
 b) in the presence of a catalyst and a water-carrying agent, conducting a dehydrating reaction by reacting a phenolic resin having a molecular-weight ranged between 350 and 4,000 with the phosphorous-containing compound of step a) in a relative equivalence ratio of 1:0.4 to 1:2 to obtain the phenolic-type phosphorous curing agent;

wherein the catalyst is added in the amount of 3-5%, by weight of the total weight of the phosphorous-containing compound and the phenolic resin of step b);

wherein the water-carrying agent is added in the amount of 10-15%, by weight of the total weight of the phosphorous-containing compound and the phenolic resin of step b), and wherein the water-carrying agent is at least one selected from the group consisting of benzene, toluene, xylene, butanone, methyl isobutyl ketone, cyclohexanone and cyclohexanol.

3. The process for producing phenolic-type phosphorous curing agent defined in claim 2, wherein the phenolic resin is at least one selected from the group consisting of BPA-type phenolic resin, salicylaldehyde-type phenolic resin, glyoxal-type phenolic resin, hydroquinone-type phenolic resin and benzaldehyde-type phenolic resin.

4. The process for producing phenolic-type phosphorous curing agent defined in claim 2, wherein at step b) the phenolic resin and the phosphorous-containing compound is reacted in a relative equivalence ratio of 1:0.6 to 1:1.5.

5. The process for producing phenolic-type phosphorous curing agent defined in claim 3, wherein a molecular weight of the phenolic resin is ranged between 1,000 and 3,000.

6. The process for producing the phenolic-type phosphorous curing agent of claim 2, wherein the catalyst of step b) is at least one selected from the group consisting of sulfuric acid, methanesulfonic acid, trifluoromethanesulfonic acid, p-toluene sulphonic acid, sodium acetate, potassium acetate, cobalt acetate, ferric acetate, zinc acetate and lead acetate.

* * * * *